United States Patent
Albright (10) Patent No.: US 9,632,671 B2
(45) Date of Patent: Apr. 25, 2017

(54) SYSTEMS AND METHODS FOR PROVIDING INFORMATION PERTAINING TO PHYSICAL INFRASTRUCTURE OF A BUILDING OR PROPERTY

(71) Applicant: Albright Insights, Inc., Hudsonville, MI (US)

(72) Inventor: James R Albright, Hudsonville, MI (US)

(73) Assignee: Albright Holdings, Inc., Grand Haven, MI (US)

( * ) Notice: Subject to any disclaimer, the term of this patent is extended or adjusted under 35 U.S.C. 154(b) by 327 days.

(21) Appl. No.: 13/833,661

(22) Filed: Mar. 15, 2013

(65) Prior Publication Data

US 2013/0205257 A1 Aug. 8, 2013

Related U.S. Application Data

(63) Continuation-in-part of application No. 13/213,152, filed on Aug. 19, 2011, now Pat. No. 8,434,029.

(51) Int. Cl.

| | |
|---|---|
| *G06F 17/00* | (2006.01) |
| *G06F 3/0484* | (2013.01) |
| *G01C 21/20* | (2006.01) |
| *H04M 1/725* | (2006.01) |
| *H04W 4/04* | (2009.01) |

(52) U.S. Cl.
CPC ....... *G06F 3/04842* (2013.01); *G01C 21/206* (2013.01); *H04M 1/72572* (2013.01); *H04W 4/043* (2013.01)

(58) Field of Classification Search
CPC ................ G06F 17/30; G06T 19/00
USPC ......... 715/771, 730; 370/312; 701/431, 532, 701/426, 527; 709/205
See application file for complete search history.

(56) References Cited

U.S. PATENT DOCUMENTS

| | | | |
|---|---|---|---|
| 5,386,360 A | 1/1995 | Wilson et al. | |
| 6,529,911 B1 * | 3/2003 | Mielenhausen | |
| 6,907,300 B2 | 6/2005 | O'Mahoney et al. | |
| 6,915,204 B1 * | 7/2005 | Heideman | 701/527 |
| 7,044,372 B2 * | 5/2006 | Okuda et al. | 235/384 |
| 7,197,514 B2 | 3/2007 | Boros et al. | |
| 7,634,737 B2 | 12/2009 | Beringer et al. | |
| 8,010,906 B1 * | 8/2011 | Sinnard et al. | 715/771 |
| 8,239,130 B1 * | 8/2012 | Upstill et al. | 701/426 |
| 2002/0010522 A1 | 1/2002 | Martin | |
| 2002/0116121 A1 * | 8/2002 | Ruiz et al. | 701/208 |
| 2003/0033079 A1 * | 2/2003 | Endicott | 701/200 |
| 2003/0097240 A1 | 5/2003 | Atasoy | |
| 2003/0140571 A1 * | 7/2003 | Muha et al. | 52/79.1 |

(Continued)

*Primary Examiner* — Li Sun
*Assistant Examiner* — Jasmine Wan
(74) *Attorney, Agent, or Firm* — Frank M. Scutch, III (57) ABSTRACT

A computer implemented system and method for displaying information pertaining to physical infrastructure in a building or on a property via a mobile software application operating or a mobile device are provided. The mobile software application includes steps of (a) optionally displaying a list of selectable buildings and/or areas at a property, (b) optionally displaying a list of selectable floors if a building having multiple floors is selected, (c) displaying a list of points of interest for the selected floor, building or area, and (d) displaying a floor plan or area map with selected points of interest highlighted.

5 Claims, 5 Drawing Sheets

(56) References Cited

U.S. PATENT DOCUMENTS

| | | |
|---|---|---|
| 2004/0103431 A1 | 5/2004 | Davenport et al. |
| 2006/0120607 A1* | 6/2006 | Lev ............................... 382/217 |
| 2008/0276169 A1* | 11/2008 | Sussman ............... H04M 3/493 |
| | | 715/705 |
| 2008/0313543 A1* | 12/2008 | Altberg et al. ............... 715/730 |
| 2009/0100070 A1* | 4/2009 | Quartararo ........ G06F 17/30241 |
| 2010/0036599 A1 | 2/2010 | Froeberg et al. |
| 2010/0080163 A1* | 4/2010 | Krishnamoorthi et al. .. 370/312 |
| 2010/0125478 A1 | 5/2010 | Bisht |
| 2011/0088000 A1* | 4/2011 | Mackay .................. G06T 19/00 |
| | | 715/853 |
| 2011/0238291 A1* | 9/2011 | Bach ............................. 701/201 |
| 2011/0276634 A1* | 11/2011 | Maruyama et al. .......... 709/205 |
| 2012/0066215 A1 | 3/2012 | Gerstner et al. |

\* cited by examiner

SYSTEMS AND METHODS FOR PROVIDING INFORMATION PERTAINING TO PHYSICAL INFRASTRUCTURE OF A BUILDING OR PROPERTY

CROSS REFERENCE TO RELATED APPLICATIONS

This application is a continuation-in-part under 35 U.S.C. §120 of U.S. patent application Ser. No. 13,213,152 entitled Systems and Methods for Providing information Pertaining to Physical Infrastructure of a Building or Property filed Aug. 19, 2011 and commonly assigned to Albright Insights, Inc.

FIELD OF THE INVENTION

This invention relates to systems and methods for providing information pertaining to physical infrastructure of a building or property, including the location and attributes of facilities such as restrooms, entrances and elevators.

BACKGROUND OF THE INVENTION

Buildings and/or properties often have directories that provide, some general information pertaining to the location of particular types of physical infrastructure, such as the location of restrooms, stairs, elevators, dining facilities, etc. However, such directories are usually located only at selected locations, such as the main entrance or main lobby. Such directions are not portable and are not capable of providing detailed information.

Known mobile devices (e.g., smart phones and/or tablet computers) have applications that provide directions (e.g., driving instructions) on how to travel from one location or address to another location or address. However, these applications do not provide information relating to the infrastructure of a building or property at a particular location, and do not provide details regarding the physical infrastructure in a building or at a location.

BRIEF SUMMARY OF THE INVENTION

Methods and systems are provided for retrieving and displaying information pertaining to physical infrastructure in a building or complex via a mobile software application operating on a mobile device (e.g., a smart phone, tablet computer or the like).

A computer implemented method for displaying information pertaining to physical infrastructure of interest to a user in a building or at a property includes: (a) optionally displaying a selection of buildings and/or areas of a property for user selection; (b) optionally displaying a selection of floors for a building having multiple floor levels; (c) displaying a list of points of interest for a selected floor of a building having multiple floor levels, a selected building having only a single floor level, or a selected area and (d) displaying a floor plan or area map with the selected points of interest highlighted. In certain cases, the floor plan or area map highlighting the selected points of interest will provide sufficient information to allow the user to navigate to the desired point of interest. In certain other cases, the user may desire detailed information concerning the selected point of interest. In such case, a particular highlighted point of interest may be selected to display detailed textual and/or graphical information pertaining to the selected point of interest.

A system for displaying information pertaining to physical infrastructure of interest to a user in a building or at a property includes a display, a user interface, a processing device, and a memory for storing instructions executable by the processing device to (a) optionally display a selection of buildings and/or areas of a property for user selection, (b) optionally display a selection of floors of a building having multiple floor levels, (c) display a list of points of interest for a floor of a building having multiple floors, a selected building having a single floor level, or the selected area, and (d) displaying a floor plan or area map with the selected points of interest highlighted. At the user's option, a particular highlighted point of interest may be selected to display detailed textual information pertaining to that point of interest.

Further details and various features, objects and advantages of the invention are provided in the description of the preferred embodiments, the drawings and claims.

DETAILED DESCRIPTION OF PREFERRED EMBODIMENTS

The computer-implemented methods and systems of the invention described herein may be used by generally any person that is interested in finding particular points of interest in a building or at a property, such as restrooms, telephones, ATM's, fire alarms, changing stations, assistance, parking, dining, first aid and/or other emergency services, stairs, elevators, etc. However, the systems and methods of this invention were developed for, and will be especially beneficially employed by, individuals having disabilities, with relevant points of interest including wheelchair ramps, parking for the disabled, and wheelchair accessible restrooms. However, because different disabilities require different needs, detailed information regarding physical characteristics or attributes of points of interest are preferably provided in certain embodiments of the systems and methods of the invention disclosed herein. Such information includes precise dimensions of restroom stalls, the height of sinks, wheelchair accessibility to facilities, such as sinks, including under sink clearance and reachability of faucets and/or valves for controlling running water to sinks, the height of elevator push buttons, the dimensions of elevators, etc.

Figure 1:
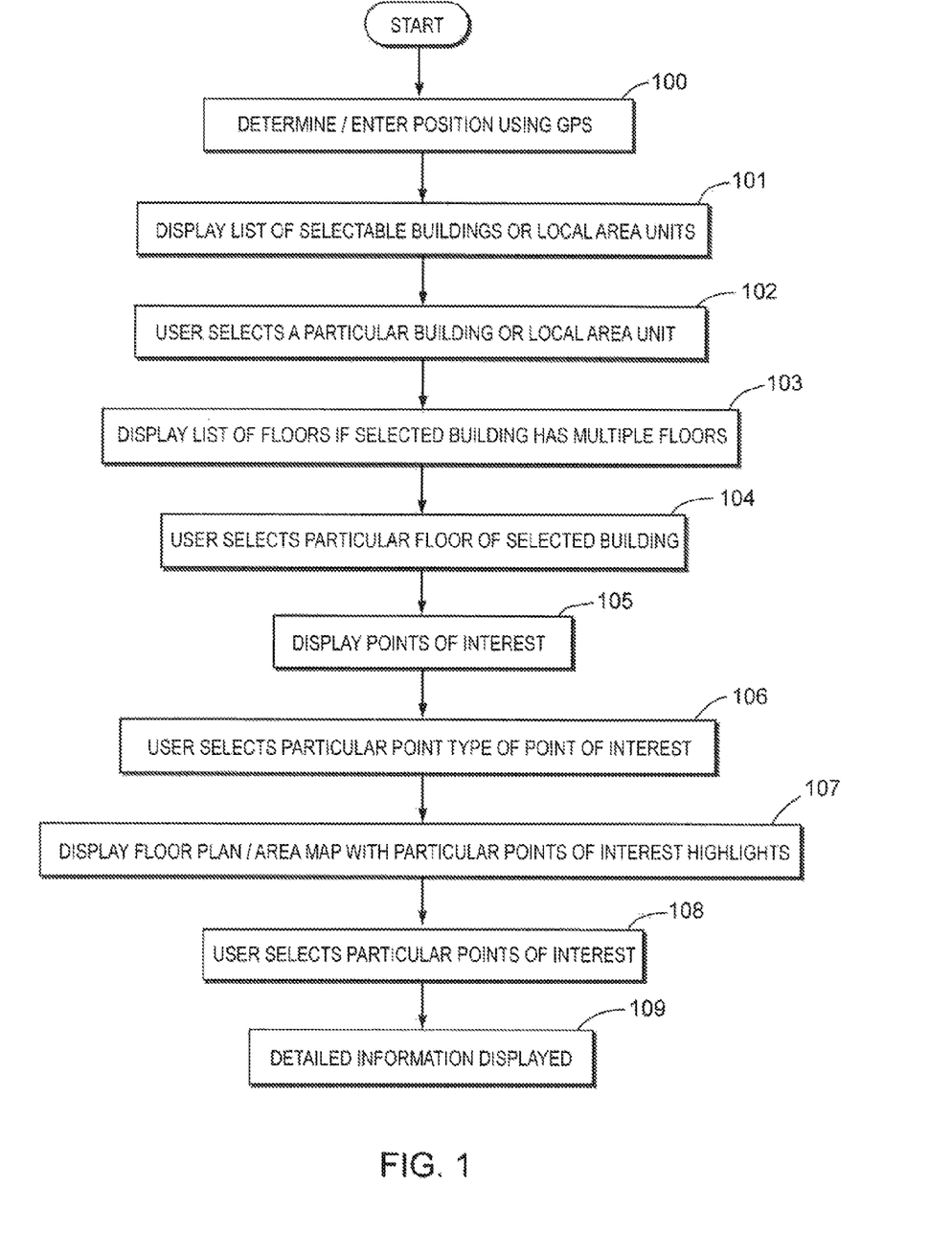
FIG. 1 is a flow diagram showing the steps for a computer implemented method for displaying information pertaining to physical infrastructure of a building or property.

FIG. 1 is a flow diagram illustrating how the computer implemented methods and systems of the invention may interact with a user desiring information regarding points of interest in a building or at a property. In certain cases, the method may be limited to a particular building or property. In other cases, the method may involve a property having multiple buildings and/or areas. In such case, the method includes a step 101 of displaying a list of selectable buildings and/or areas of a property. For example, a list of buildings at a university or college campus, a list, of buildings at a research facility or other complex, or a list of buildings at a government facility. The listing may also include structures or areas that are not buildings. For example, a large amusement park may include a combination of buildings that may be listed, and amusements that may not be regarded as buildings, such as roller coasters and other amusement rides. In the event that the methods and systems of this invention are used for a single building, this first step of displaying a list of selectable buildings and/or areas of a property may be omitted. The text of the list of buildings may be displayed in user-selectable colors depending on a particular building type or style and/or may be displayed with icons or images of the building for more rapid identification by the user. The text, icons or images my be scrolled for better organization and selection by the user.

It is also envisioned that in certain embodiments, the methods and systems of this invention will not be limited to particular buildings or properties, but may instead, be used to acquire infrastructure information about a variety of different buildings and/or properties. In such cases, the user may be able to select a particular building or property from a list, by inputting an address or coordinates, by pointing to a map display having pan and zoom features, or from a list generated based on GPS data. The GPS data may be self-generated internally to the mobile device by on the location of the user. Thus, an embodiment of the present invention is that information can be included for use in indoor or outdoor building, and/or facilities.

The user may then execute step 102 of selecting a particular building or area of a property. Thereafter, the methods and systems of this invention implement a step 103 of displaying a list of floors in the event that a building having multiple floors is selected. Otherwise, step 105 is implemented and steps 103 and 104 are skipped. The user may take step 104 of selecting a particular floor of interest in the selected building. Thereafter, in step 105, available points of interest at a selected, single level building, floor of a multiple level building, or area of a property are displayed. The user may then select a particular category (ramp, door way, restroom etc.) or type of point of interest, as indicated in box 106. Thereafter, a floor plan or area map is displayed with the selected point of interest or the selected points of interest highlighted. For a particularly selected category of points of interest, a single point of interest or multiple points of interest may be available. For example, a single floor level of a building may have multiple restrooms, all of which would be highlighted, such as in a different color. Often, the map or floor plan highlighting the location of selected points of interest provides sufficient information to allow the user to navigate to the desired point of interest. In other cases, the user may select a particular point of interest out of a plurality of displayed points of interests for additional detailed information that may be displayed in either a textual format, in a graphical format such as an icon, or in a combination of both.

Figure 2:
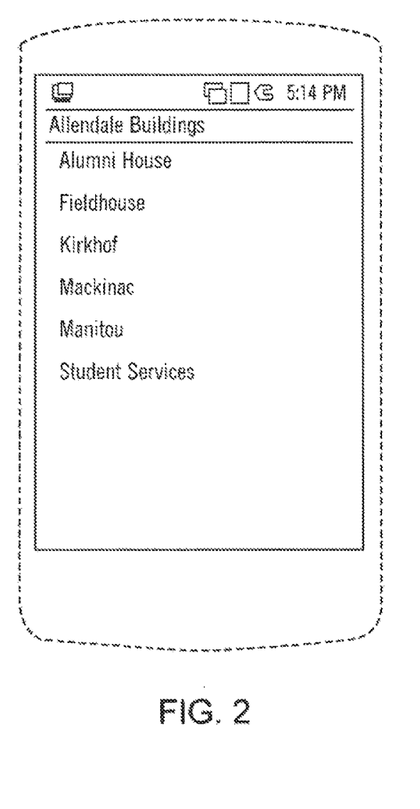
FIG. 2 is a screen shot of a display showing an example of buildings that can be selected at a particular property, such as a college campus.
Figure 3:
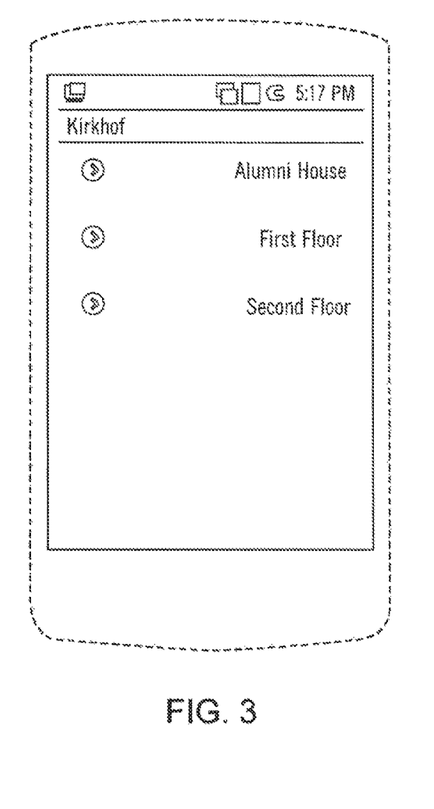
FIG. 3 is a screen shot of a display of floor levels that can be selected for a particular building that has been selected from the display of FIG. 2.
Figure 4:
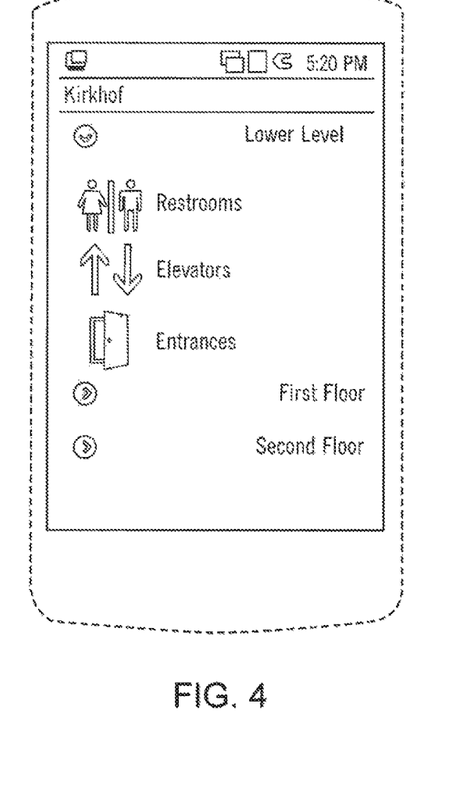
FIG. 4 is a screen shot of an example of points of interest for a particular floor selected from the screen shot of FIG. 3.
Figure 5:
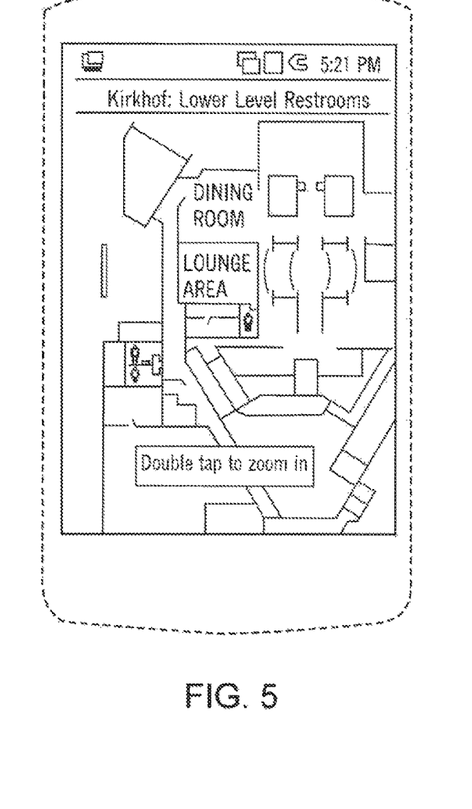
FIG. 5 is a screen shot of a floor plan selected from FIG. 3, with the points of interest selected from FIG. 4 highlighted.
Figure 6:
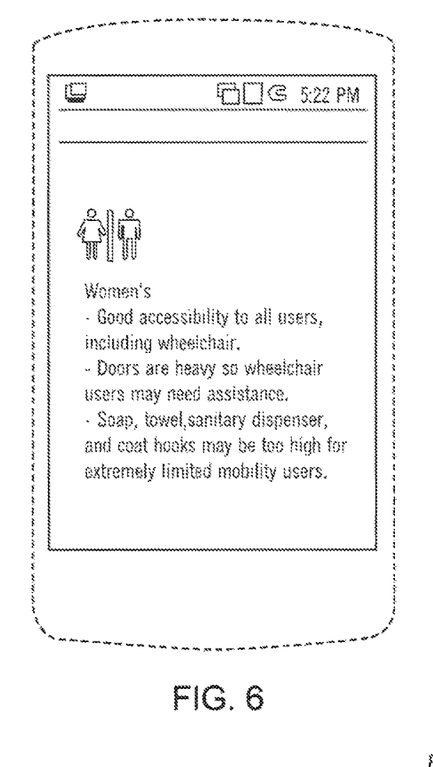
FIG. 6 is a screen shot showing detailed textual information regarding a particular point of interest selected from the floor plan shown in FIG. 5.

FIG. 2 shows a particular example in which the buildings at a college campus are listed. The user may select, through a user interface, such as a touch screen display, the particular building of interest. In the illustrated example, the user selects the Kirkhof building. In this case, three floor levels are available as illustrated in FIG. 3. In the example, the user is on the lower level and selects the lower level from the screen illustrated in FIG. 3. In this example, catalogued points of interest for the lower level of the Kirkhof building include restrooms, elevators and entrances as shown in FIG. 4. In the illustrated example, the user is interested in determining the location of restrooms on the lower level of the Kirkhof building and therefore selects restrooms in FIG. 4. Thereafter, a floor plan for the lower level of the Kirkhof building is displayed with the restrooms highlighted, such as in a different color. In this illustrated example, the user selects the woman's restroom, such as by touching the touch screen display where the woman's restroom is illustrated. Thereafter, detailed information regarding the restroom is displayed as illustrated in FIG. 6.

Figure 7:
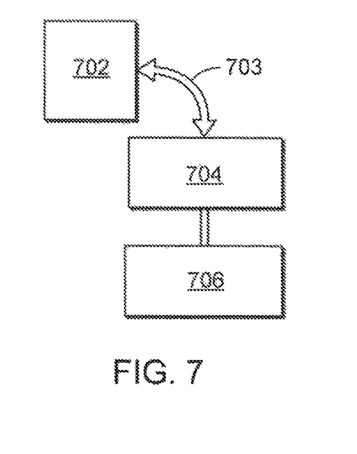
FIG. 7 is a schematic diagram showing a system and process for displaying information pertaining to physical infrastructure in a building or at a property via a mobile software application operating on a portable device (e.g., a smart phone, tablet computer, or the like).

Generally, the memory on a smart phone is not sufficient to store all of the floor plans and/or maps and details regarding points of interest in all the buildings and/or areas of a property, such as a college campus, research facility or amusement park. Accordingly, as illustrated in FIG. 7, the systems and processes of this invention may include a mobile device 702, which may be a smart phone, tablet computer, or other portable device having a processor, a display, and a suitable user interface (e.g., a touchpad screen), including means for wireless communication (indicated by arrow 703) with a network 704 connected with servers 706 for storing the lists of buildings, areas, floor plans, area maps, points of interest, and detailed information described above. The wireless communication can be via a local area network, a wide area network or mobile internet access (e.g., third or fourth generation mobile telecommunications or such technologies as long term evolution (LTE).

Figure 8:
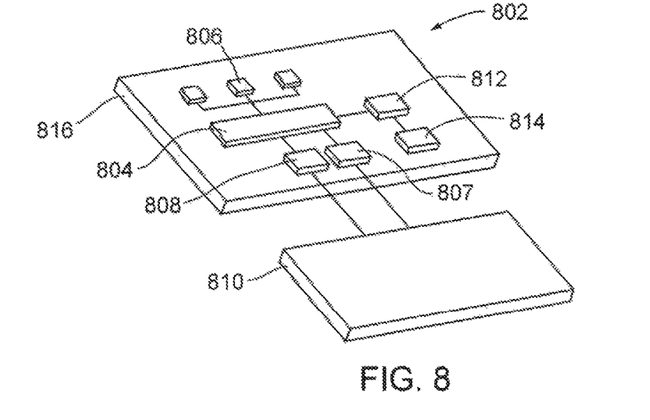
FIG. 8 is a diagram of a portable computing device that may be used to implement the systems and methods described, herein.

Mobile device 702 includes computing device 802 having a processor 804 that may communicate with a user through a control interface 808 and display interface 807 coupled to a display 810. Display 810 can be a thin film transistor liquid crystal display or an organic light emitting diode display or other suitable display. Display interface 807 may comprise appropriate circuitry for driving the display 810 to present graphical and textual information to a user. The controlled interface 807 may receive commands from a user and convert them for submission to processor 804. Computing device 802 may also include memory 806, a communications interface 812 and a receiver 814, among other components. Each of the components may be interconnected using busses, and the components may be mounted on a common motherboard 816.

FIG. 8 is a diagram of a portable computing device that may be used to implement the systems and methods described herein. A non-transitory computer readable medium having computer readable instructions stored thereon for execution by at least one microprocessor such as memory 806 stores information within computing device 802. Those skilled in the art will recognize that memory 806 can be implemented as one or more of a computer-readable medium or media, a volatile memory unit or units, or a non-volatile memory unit or units. Additionally, expansion memory may be provided and connected such as through an expansion interface.

In certain embodiments, a computer program containing instructions that, when executed, perform one or more methods, as described above, is tangibly embodied in memory 806, or expansion memory, or is a propagated signal that may be received over transmitter 814.

Device 802 may communicate wirelessly through communication interface 814, which may include digital signal processing circuitry when necessary, under various modes or protocols, such as GSM voice calls, SMS, EMS, or MMS messaging, CDMA, TDMA, PDC, WCDMA, CDMA 2000, or GPRS, among others.

Figure 9:
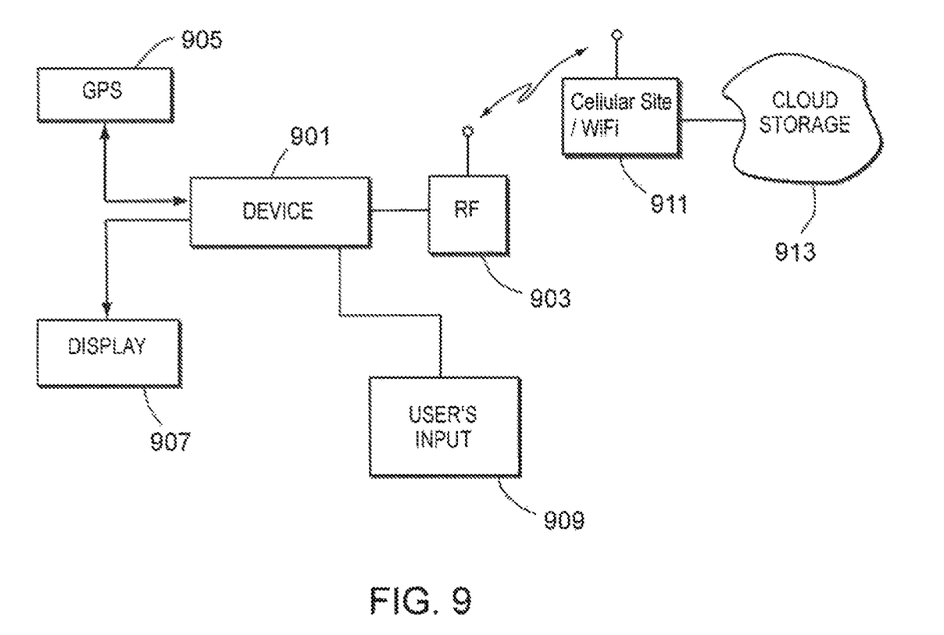
FIG. 9 is a block diagram illustrating a wireless communications system according to embodiment of the invention.

FIG. 9 shows still yet another embodiment of the invention where a communications system uses information from the mobile device that can be input into either cloud services or other storage via the Internet. The communication system includes a mobile device 901 that may be a cellular telephone, tablet, Personal Digital Assistant (PDA) or the like that includes a radio frequency transceiver 903. A global positioning system (GPS) 905 provides location information of the device and user to a microprocessor in the mobile device 901. A display 907 displays information from the mobile device 901 while the user can also input data regarding a building or handicapped area to the device 901. The user input 909 may be voice recognition, key board or the like that enables the user to input data to the device 901. This data can then be sent via the RF transceiver 903 to a base station site or WiFi device 911 where is can be stored via the Internet into a cloud 91 or other memory location. In this manner, a global positioning system (GPS) in the mobile device works to locate the user. This information such as input data from the user including but not limited to size and dimensional information of such areas as rooms, stalls, doorways and ramps all others to input data into the software application. This data can then be stored using cloud services or the Internet where it can be shared with other users of the application at this or other locations. In use, the application can include various fields for inputting dimensional information, notes or other data from other users of the software application. This allows information to be freely shared with others about a desired location, building and/or other facilities for use by the handicapped. Desirably, in certain embodiments, the systems and methods disclosed herein employ an appropriate combination of user interfaces and software commands that facilitate interaction with the maps and/or floor plans displayed, including zooming and panning of the map and/or floor plan.

Those skilled in the art that an embodiment of the present invention is directed to software like that of XCESS-ABLE software developed by Albright Insights, Inc, Software of this type is the brainchild of James Albright who is a graduate of Grand Valley State University who holds a Bachelor of Science Degree in Computer Science. Mr. Albright has a disability and uses a power wheelchair. Albright Insights, Inc. has developed a mobile application that can help ALL persons, especially those with disabilities, locate and access usability information about points of interest (POI) like restrooms, entrances, elevators, and much more.

White much of the world at large claims to be accessible to the disabled public, the specifications outlined in the Americans with Disability Act (ADA) fit individuals as well as a one size fits all garment. The design goal of the XCESS-ABLE software is to allow ALL users, (Physically Disabled, Blind and hearing impaired, Cognitively impaired, Sensory impaired, Temporarily disabled, Elderly, Families with large strollers used with multiple children, and all other Non-disabled) to locate facilities that meet the specific and individual accessibility requirements they have without having to visit each facility in person. This can be accomplished through the use of customized maps and searches that display the pertinent information upon request. Technology can be used to assist those with sensory touch, those who read with braille, voice, and more. A profile feature can allow an individual to store their own individual specifications, allowing them to navigate more quickly to POI that meet their needs. Architectural phase to be determined, but not limited to, customized client specifications utilizing a highly secure system.

The XCESS-ABLE software can offer a public and private custom application (app) option for any user/client. A non-emergency HELP feature on the app can allow a user to call/text/tweet/pull from a common list of needs, or with the push of an icon for assistance. This may include but is not limited to sending the HELP alert to a local help desk or to other smart phone app users within a specified radius of the person needing help. It could be but not limited to a user who cannot reach a push button outside a door and needs assistance getting in the building, an elderly person who needs support in walking up the stairs, a manual wheelchair user who cannot navigate the slope of the entrance ramp independently, a person on crutches who needs their books or groceries carried and any other Help/assistance that a user has need.

A flag facilities feature can allow a user to flag such things as, but not limited to, an elevator out of service that needs repair, phone systems down, a push button that does not work, etc. Further, a custom user input feature can allow ANY user to enter their desired specifications. A person can have multiple profiles saved based on their travel and needs. This inputs or questions the application could include, but are not limited to, a person who experiences a short term injury that requires adaptive assistance, physical limitations such as a power or manual wheelchair user. Are they in a bariatric wheelchair that needs a greater clearance? Can they navigate the slope of a ramp independently?, Do they have a service dog? Do they drive reclined? Do they have a broken leg that is elevated in the chair? Do they have a ventilator attached on the back of their chair that extends the length of the chair? Do they have Cerebral Palsy or a disorder that creates limited walking/distance abilities such as the elderly, specifics of ANY physical limitations such as reach distance or ability to lift arms and legs. Are they blind using a cane or a service dog, hearing impaired, DO they need the "Loop System"or a deaf interpreter?, bariatric needs, uses a walker, cane or crutches, Users who have prosthetics or missing limbs, families with twins or triplets, etc. who have extra wide strollers and need family size restroom. A user can enter and store the dimensions of their vehicle for purposes of parking, wheel chair or walker dimensions for purposes of entrance widths and turning radius' in an elevator or restroom, and whether a chair can fit under a table, etc. and the application can lead them only to accommodations that meet their specific needs at any given complex. The measured information gathered into the database for the height, width, depth, of items within a point of interest can match their limitations and needs to direct them only to what works for them. It is up to the user to decide what kind of accessibility experience they prefer and need. A user may also access pictures, advertisements and info about the complex, etc. that they can be visiting in-order to gain enough information to decide if their personal needs can be met.

The application can include a custom indoor GPS system, that uses but is not limited, to the use of Wi-Fi triangulation, Bluetooth or some means of nodes placed throughout a facility, grid overlay, moveable walls to reach a destination point more accurately such as for locating a cubicle in an office, a conference room or a vendor at a convention center, arena or any other complex. Although all routes can be displayed for individual and all user needs, the focus is on accessible routes for those with special needs. Development can include a means to track moveable objects within a complex such as, but not limited to, office equipment like copy machines, medical equipment, robots used within a facility, movable cubicles/walls, vending machines, parade routes in amusement parks or towns, moveable vendor stands at amusement parks or any other town or event, and all other moveable objects custom requested by a client.

In still yet another embodiment, three dimensional (3D) colored map views can be used fir indoor and outdoor possibly, but not limited to, using laser beam style illustrations and technology to create a 3D image of the building and ALL of its floors for navigational purposes. Future development can also include a virtual game about wheelchair user/other disabilities navigating a place of interest and the challenges they face. A scoring system based on accomplishments would be incorporated but not limited to such, as well as other components related to disabilities. The purpose of such game would bring disability and accessibility challenge awareness to the population at large. The goal would be to place importance the independence that technology can give to those with special needs and to help the population at large learn to look for way to offer assistance to others who may need help navigating or struggle with some of life's challenges.

Further applications include all smart phone users Internationally, including but not limited to, any mobile platform, notepads, tablets, web app, etc., Universities, Dorms, Apartments, student centers, schools, hospitals, health centers, hotels, amusement/theme parks/accessible park rides, local/state/national parks and recreation, picnic areas, playgrounds, Campgrounds, cabins, condominiums, beaches, zoos, restaurants/dining, towns, cities, historical sites, architecture firms, construction companies, corporate businesses, area businesses, airports/planes, cruise ships/harbors/ports on international bodies of water, trains/stations, tour buses/stations, travel trailers/RV, bus stops, arenas, stadiums, ball fields, convention centers/exhibits, museums, stores, malls (like Mall of America), theaters, ski resorts, ice rinks, soccer fields, tennis courts, public pools, government buildings, aquariums, etc. and any other places of interest requested by a client. Each of these locations and/or facilities could have accessibility information available.

The application might include Point of Interest (POI) types and textual information entered into database Internationally that will/could include and be available to all users with a focus on accessibility for those with specific special needs. This information could be directed to Parking, Entrances, elevators, stairs/stair lifts, ramps (heated or cleared in increment weather), restrooms/accessible restrooms/family/unisex, baby change stations, nursing nests, Accessible Bridal room, path/walkways/trails, Dining, Emergency phones/braille, Public accessible computer, WI-Fi, emergency exits, emergency escape routes, Tornado shelter, Fire extinguishers and fire pulls, Fire strobe lights, sprinkling systems, fire hydrants, eye wash stations, emergency HELP feature, First-Aid centers, Emergency phones/public phones, class rooms/lecture halls/labs/conference halls, music halls/theaters/auditoriums, mail drops, drinking fountains/cup dispensers, pools/lift system for pool/lifeguards/accessibility, wheelchair ramp in pool, accessible shower, exercise rooms, gymnasiums/track, common areas, art centers, ice rinks, ball fields, soccer fields, tennis courts, wheelchair available/rental, ATM, AED's, Mail drops, public computers and their accessible features, coin machines, lockers, laundry facilities, conference rooms/features, accessible seating, Accessible trails, Accessible camping/cabins/guide assistance, braille maps, braille on exhibits, and their features, Accessible Kayaking and launches, accessible beaches/fishing peers, beach wheelchairs, all beach commodities, accessible hot tubs/saunas, hearing impaired "Loop system", Braille service/on facility features, menus, etc., Accessible port of calls, Accessible hotel/cabin/etc. rooms with accessible height light switches, speaker phones, accessible refrigerators, adjustable/accessible height desks, width of transfer between two objects, accessible spa services, Access to durable medical equipment, doctor on premises, Hoyer lift or such available on premises, any, not limited to, all features requested by the client in the customization of for example an Xcess-Able software application.

Examples of information gathered for any Point of Interest/Attributes stored can include, but not limited to the following information in a database: Latitude/Longitude, Parking permit required, Lot number, Number of accessible spots, Lat/Long of accessible spots. Number of pregnant mother spots/Lat/Long, Accessible shuttle available/Lat/Long, Accessible bus available/Lat/long.Entrance number/name/Latitude/Longitude, braille on entrance, floor number, single or double entrance/one or two sets of doors, width of door/doors, push button/location of button/height of button, auto sensor/timing of door, weight of door, height of handle on door, barrier-free or not, open entrance, revolving door/timing on door/height of button, voice activated entrance, slip-resistant, marked emergency entrance, ramped/degree of slope on ramped entrance. Further information might include deaf or foreign interpreter available or attendant available to assist. Wheelchair available for those who may temporarily need it do to the size of the complex and amount of walking it would require. Public phone available? Public computer available?

With regard to restrooms, the application might include such information as restroom number, floor number, men's, women's, unisex, Family, Handicap-accessible, Private/public, Attendant in restroom? Is there a push button on door entrance? Further information might include such things as: the type of door, weight of door, swing direction of door, width of door, push button/no push button/height of button, door lever type/height, height of hooks on door, soap dispenser—height, auto, hand sanitizer/height, paper towel dispenser—auto, pull, height, hand dryer-type/height, sanitary/condom dispenser—height, height of counter/sink—depth, type of faucet/is it auto?/height, bathroom stall—accessible, single, double, length/width and whether sink, in the stall/height of sink, auto sink or not, towel dispenser/type, height/accessible or not, soap dispenser in stall, height, toilet paper dispenser/height/placement, direction of door swing/clearance for wheelchair, purse/book shelf/placement of shelf/height of shelf, grab bar/height/placement, toilet—Auto/water saver, child/adult toilet/height of toilet/urinals/height if urinals, baby-change station/location in restroom/height of change table, nursing nest, shower in restroom/width/roll-in/handicap/roll-in chair available, towel rack/ height, towels provided or not, bench/change table for child/adult, lockers in restroom/height of lockers/accessible lockers, coat rack/height. Accessible bridal room.

With regard to elevators, information might include the location of elevator/Latitude/Longitude, Length/width of elevator—Can a wheelchair fit and is there enough turning radius for a wheelchair Height of external/internal buttons, position of buttons in elevator (corner, middle of wall) Are the buttons accessible to a wheelchair user? is there braille on the buttons for the blind user? Voice activated elevator, which helps those with limited mobility, Emergency phone/connected/height, braille on buttons. Fire protected wall/for what length of time?, Freight elevator, Escape plan if stuck between floors such that an emergency escape plan can be posted on upper levels of a complex when the elevator is out of service for those in power/manual wheelchairs, those who are physically fragile or limited mobility.

With regard to dining, the application might include such information as the name of building, floor number, name of the restaurant/vendor, height of counters, accessible/reserved tables/height/clearance, accessible/braille menu, dispensers for drinks, cups, silverware, plates, bowls, /napkins, condiments, ice/ice-cream, height of each, height of serving lines, trays available for wheelchair users, height of microwave/vending machines/water/toaster/cashier counter, help/assistance available, deaf interpreter/foreign interpreter available to help. With regard to drinking fountains the application might include such information, as the location of fountain/Lat,Long, height of clearance below fountain for wheelchair users and the blind using a cane height to drink from fountain. Type of lever/placement of lever for fountain/is it too heavy for a user with limited strength/mobility depth of reach at fountain where there is a water bottle fill option, can the user reach it if there arms are weak or contacted height of reach to a cup dispenser at fountains that offer this feature—Can the user in a wheel chair reach it?

With regard to conference rooms, the application might include such information as; Name/location of facility Lat/Long of conference room; Dimensions of conference room; Is it wheelchair accessible? Are service dogs allowed? Width of door/Braille signage? Type lever—entrance/height of lever. Type of phone/speaker/conference/video conference; and the Height of light switches/outlets. Further information might include whether the screen, TV, VHS, DVD, Projector can be operated with a remote?; Is there "Loop system" available? Is there a deaf interpreter available? Is there braille available? Is there an accessible Xerox machine, coffee maker, accessible kitchen; is there catering available/assistance available Nearest accessible emergency exit, tornado shelter, fire extinguisher, fire pull.

Thus, an embodiment of the present invention is directed to a non-transitory computer readable medium having computer readable instructions stored thereon for execution by a processor to perform a method for determining the location of a mobile device and operating the mobile device with a mobile software application for retrieving data from memory and having a user interface and a display, wherein the mobile software application includes machine executable instructions for displaying a vertical listing comprising areas at a property that are handicapped accessible, displaying with the areas at the property a list of categories including points of interest and displaying dimensions of the selected point of interest with user information regarding detail so the selected point of interests handicapped accessibility for allowing persons to determine if they maneuver a wheelchair within the selected point of interest.

The invention has been described with reference to the preferred embodiments. Of course, modifications and alterations will occur to others upon reading and understanding the preceding description. It is intended that the invention be construed as including all such modifications and alterations insofar as they come within the scope of the appended claims.

What is claimed is:

1. A computer implemented system for displaying information pertaining to physical infrastructure in a building or on a property via a mobile software application operating on a mobile device, comprising: the mobile device operating the mobile software application for retrieving data from a memory and having a user interface and a display, wherein the mobile software application includes machine executable instructions for performing the steps of:
    (a) displaying a vertical listing comprising areas at a property and user-selectable buildings having at least one building with multiple floors where the selection of buildings are displayed in a user-selectable color depending on the building type and is further displayed with an icon or image of the building for more rapid identification by the user;
    (b) in response to a user selecting one of the at least one building with multiple floors, displaying a listing of floor levels of the selected building;
    (c) in response to the user selecting one of the floor levels of the selected building, displaying immediately below the selected floor level, a list of categories of points of interest for the selected floor level;
    (d) in response to the user selecting one of the categories of points of interests in the list, displaying a floor plan or area map with points of interests belonging to the selected category of points of interests highlighted in different colors, such that text indicating the selected building, selected floor level, and selected category of points of interests is displayed with the floor plan or area map;
    (e) in response to the user selecting one of the highlighted points of interests on the floor plan or area map, displaying dimensions of the selected point of interest with user information regarding details of the selected point of interest's handicapped accessibility for allowing persons to determine if they can maneuver a wheelchair within the selected point of interest; and
    f) displaying a comment field for transmitting textual information compiled by the server regarding comments from other users of the mobile software application about handicapped accessibility of the selected point of interest.

2. The computer implemented system of claim 1, further comprising a wireless communications system for receiving data from a remotely located server.

3. The computer implemented system as in claim 1, wherein the selected point of interest includes at least one of a restroom, elevator or entrance.

4. The computer implemented system as in claim 1, further including the step of:
    g) displaying a flag facilities icon so that the user may call for local help to persons by textual messaging with mobile devices running the mobile software application and geographically located at the specific point of interest.

5. The computer implemented system as in claim 1, wherein the mobile device is a cellular telephone.

* * * * *